(12) United States Patent
Yabe et al.

(10) Patent No.: US 9,278,570 B2
(45) Date of Patent: Mar. 8, 2016

(54) PROTECTIVE LAYER TRANSFER SHEET

(71) Applicant: DAI NIPPON PRINTING CO., LTD., Tokyo (JP)

(72) Inventors: Suguru Yabe, Tokyo (JP); Yoshimasa Kobayashi, Tokyo (JP); Kazumasa Maeda, Tokyo (JP); Kazuya Yoshida, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 14/431,455

(22) PCT Filed: Sep. 5, 2013

(86) PCT No.: PCT/JP2013/073880
§ 371 (c)(1),
(2) Date: Mar. 26, 2015

(87) PCT Pub. No.: WO2014/050478
PCT Pub. Date: Apr. 3, 2014

(65) Prior Publication Data
US 2015/0258834 A1  Sep. 17, 2015

(30) Foreign Application Priority Data

Sep. 28, 2012  (JP) ................. 2012-218819
Aug. 30, 2013  (JP) ................. 2013-179299

(51) Int. Cl.
*B41M 5/382* (2006.01)
*B41M 5/52* (2006.01)
(Continued)

(52) U.S. Cl.
CPC ............ *B41M 5/5236* (2013.01); *B32B 7/06* (2013.01); *B32B 7/12* (2013.01); *B32B 23/08* (2013.01);
(Continued)

(58) Field of Classification Search
CPC .... B41M 5/382; B41M 5/38264; B41M 5/52; B41M 5/5254; B41M 5/529; B41M 7/027; B41M 2205/40; B32B 27/306; Y10T 428/3188; Y10T 428/31884; Y10T 428/31891; Y10T 428/31953; C08L 1/10; C08G 18/62
USPC ......... 503/227; 428/32.61, 32.84–32.86, 507, 428/508, 510, 536; 106/162.72; 524/40
See application file for complete search history.

(56) References Cited

U.S. PATENT DOCUMENTS

| 5,278,130 A | 1/1994 | Arita et al. |
| 6,316,385 B1 | 11/2001 | Usuki et al. |
| 6,352,767 B1 | 3/2002 | Kurokawa |

FOREIGN PATENT DOCUMENTS

| JP | 4-296595 | 10/1992 |
| JP | 6-48055 | 2/1994 |

(Continued)

OTHER PUBLICATIONS

International Search Report dated Nov. 26, 2013 in corresponding PCT/JP2013/073880.

*Primary Examiner* — Bruce H Hess
(74) *Attorney, Agent, or Firm* — Young & Thompson

(57) ABSTRACT

Provided is a protective layer transfer sheet which includes a protective layer, whereby it becomes possible to form an image on the protective layer set on a print without causing the abnormal transfer of a dye layer, the breakage of the dye layer and the like, and it also becomes possible to achieve a satisfactory level of plasticizer resistance of the print. The protective layer transfer sheet including a substrate and a protective layer peelably formed on the substrate, wherein the protective layer includes one or both of a cellulose ester having a number average molecular weight of not less than 15000 and not more than 30000 and a vinyl chloride-vinyl acetate copolymer having a number average molecular weight of not less than 15000 and not more than 30000, and a cellulose ester having a number average molecular weight of not more than 7000.

4 Claims, 1 Drawing Sheet

(51) Int. Cl.
  *B41M 7/00*   (2006.01)
  *B32B 27/30*  (2006.01)
  *B32B 7/06*   (2006.01)
  *B32B 23/20*  (2006.01)
  *B41M 5/50*   (2006.01)
  *B32B 7/12*   (2006.01)
  *B32B 23/08*  (2006.01)

(52) U.S. Cl.
  CPC ............... *B32B 23/20* (2013.01); *B32B 27/306* (2013.01); *B41M 5/382* (2013.01); *B41M 5/38264* (2013.01); *B41M 5/502* (2013.01); *B41M 5/52* (2013.01); *B32B 2307/4026* (2013.01); *B32B 2307/75* (2013.01); *B41M 5/529* (2013.01); *B41M 5/5254* (2013.01); *B41M 7/0027* (2013.01); *B41M 2205/40* (2013.01)

(56) References Cited

FOREIGN PATENT DOCUMENTS

| | | |
|---|---|---|
| JP | 2001-105747 | 4/2001 |
| JP | 2001-199162 | 7/2001 |
| JP | 2003-220768 | 8/2003 |
| JP | 3440103 | 8/2003 |
| JP | 4034856 | 1/2008 |
| JP | 2010-234734 | 10/2010 |

PROTECTIVE LAYER TRANSFER SHEET

TECHNICAL FIELD

The present invention relates to a protective layer transfer sheet.

BACKGROUND ART

Sublimation transfer method has been widely used for preparing printed articles since it can provide high-quality images of excellent transparency, and high reproducibility and high gradation of neutral tints, which are equivalent to the conventional full-color photographic images. As the printed articles, digital photographs, and ID cards which are used in various fields and known as identification card, driver's license card, membership card, and the like, are known.

In the case of image forming in accordance with the sublimation transfer method, a thermal transfer sheet that has a dye layer provided on one surface of a substrate is used. The dye layer of the thermal transfer sheet is superposed on a transfer receiving article such as a substrate for a card, and then, they are heated by a thermal head from the back face of the thermal transfer sheet so as to transfer many color dots of three or four colors onto the transfer receiving article, and thereby a printed article in which an image is formed on the transfer receiving article is obtained. According to the sublimation transfer method, since it is possible to control the transferring amount of the dye dot unit by dot unit with varying the amount of energy applied to the thermal transfer sheet, it is possible to perform a density gradation. Therefore, this method can provide a high quality image which is very vivid, and excels in the transparency, and the color reproducibility and the gradient of halftones, and which is comparable to full-color photograph image.

Although the sublimation transfer method is excellent in the formation of gradation image as mentioned above, the obtained print has disadvantages of an inferior light fastness and a poor durability, since the print is formed with dyes which each has a relatively low molecular weight, and they are different from the conventional printing ink which are made of pigments, and they does not have a vehicle. Therefore, recently, a method of forming a protective layer, in which a protective layer transfer sheet having a protective layer is superposed on the print formed by thermal transfer of sublimation dyes, then the protective layer is transferred onto the print by using a thermal head or heating roll or the like, thus, the protective layer is formed on the print, has been known. It is possible to improve the durability of the image by forming such a protective layer on the image.

For example, in Patent Literature 1, a protective layer transfer sheet which is provided with a protective layer comprising a curing type resin is disclosed. In Patent Literature 2, a protective layer transfer sheet which is provided with a protective layer mainly comprising solvent-insoluble organic particles and a binder resin is disclosed. According to the protective layer transfer sheets disclosed in these Patent literatures, it is said that the image (hereinafter, it is also referred to as "print", occasionally.) is able to impart durability such as plasticizer resistance or the like. Further, other various attempts have been also made with respect to the protective layer transfer sheet for improving the plasticizer resistance of the image.

Incidentally, recently, there are some wishes to form a further image on the protective layer provided on the print by using various dyes. However, the protective layers which have been made various studies to date, for example, as are proposed in the Patent Literatures 1 and 2, are aimed to improve the durability, such as the plasticizer resistance or the like, that is usually required function for the protective layer, and thus it has not been studied at all for dyeing property against various dyes of the protective layer, and they have no dyeability. Therefore, it is not possible to perform image formation on any conventional protective layer. In addition, the protective layer has not been studied at all about releasability between the protective layer and the dye layer. Thus, when the image formation is carried out by superposing a dye layer on a protective layer which are known to date, it is not possible to sufficiently satisfy the releasability between the protective layer and the dye layer, it may cause problems such as an abnormal transfer where the dye layer is entirely transferred to the protective layer or breakage of the dye layer, as a result of closely sticking the dye layer on the protective layer.

Moreover, in the case that a protective layer integrated type thermal transfer sheet in which a protective layer and dye layers are arranged sequentially in parallel on a substrate across the surface of the substrate is used, and a continuous printing is performed so as to transfer the protective layer onto a print and to form an image on the transfer receiving article, if a certain trouble such as conveyance failure of a printer or the like may arise, it may cause an event that, on the protective layer transferred onto print, a dye layer which is used to form a next screen is overlapped. In such a case, if a releasability is not given to the protective layer, the dye layer of the protective layer integrated type thermal transfer sheet may be closely stuck on the protective layer which has been transferred at a previous screen, and as a result, the dye layer of the protective layer integrated type thermal transfer sheet may be broken out. Therefore, it becomes necessary to have a sufficient releasability for the protective layer in such a protective layer integrated type thermal transfer sheet.

Incidentally, when an image is simply formed on the protective layer, the as-is diversion of a binder resin which is contained in the dye receiving layer of the thermal transfer image-receiving sheet to the binder resin of the protective layer of the protective layer transfer sheet may be considered to be sufficient. Although the binder resin contained in the dye receiving layer of the thermal transfer image-receiving sheet has a dyeability, however, it is not have been considered for the plasticizer resistance, etc., at all, it cannot serve as a protective layer to protect the print. In other words, it can be said that the dyeability and the plasticizer resistance are in a trade-off relationship.

PRIOR ART'S LITERATURE

Patent Literature

Patent Literature 1: Japanese Patent No. 3440103
Patent Literature 2: Japanese Patent No. 4034856

SUMMARY OF THE INVENTION

Problems to be Solved by the Invention

The present invention has been made in such circumstances, and the present invention is mainly aimed to provide a protective layer transfer sheet which comprises a protective layer to be transferred onto a print, whereby it becomes possible to form an image on the protective layer set on a print without causing the abnormal transfer of dye layers to be used and the breakage of the dye layers and the like, and it also becomes possible to give a satisfactory level of plasticizer resistance of the print.

Means for Solving the Problems

The present invention for solving the above problems is a protective layer transfer sheet which comprises a substrate, a protective layer peelably formed on the substrate, wherein the protective layer comprises (A) one or both of a cellulose ester having a number average molecular weight (Mn) of not less than 15000 and not more than 30000 and a vinyl chloride-vinyl acetate copolymer having a number average molecular weight (Mn) of not less than 15000 and not more than 30000, and (B) a cellulose ester having a number average molecular weight (Mn) of not more than 7000, wherein the ratio of the total content of the components (A) and (B) to the total solid content in the protective layer is not less than 70% by mass, and the ratio of the content of the component (B) to the total mass of the components (A) and (B) is not less than 10% by mass and not more than 30% by mass.

The protective layer may further contain a polyethylene wax having a number average molecular weight (Mn) of not less than 2000 and not more than 3000, wherein the ratio of the content of the polyethylene wax to the total solid content in the protective layer is not less than 1% by mass and not more than 10% by mass. The protective layer may further contain a fluorinated resin.

Effect of the Invention

According to the protective layer transfer sheet of the present invention, it becomes possible to form an additional image on the protective layer provided on a print without causing the abnormal transfer of the dye layers to be used and the breakage of the dye layers and the like, and it also becomes possible to give a satisfactory level of plasticizer resistance of the print.

EMBODIMENTS TO BE CARRIED OUT THE INVENTION (Protective Layer Transfer Sheet)

Figure 1:
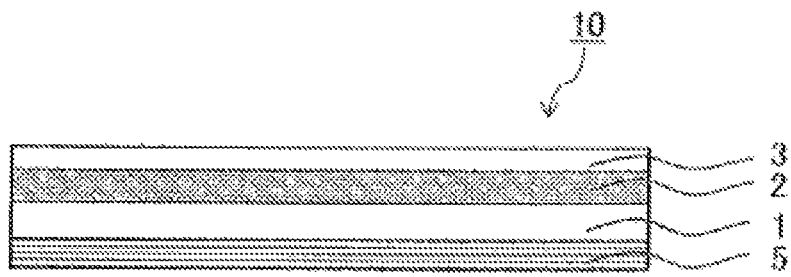
FIG. 1 is a schematic sectional view showing an embodiment of the protective layer transfer sheet according to the present invention.

Now, the protective layer transfer sheet according to the present invention will be described in detail. FIG. 1 is a schematic sectional view showing an embodiment of the protective layer transfer sheet of the present invention.

As shown in FIG. 1, the protective layer transfer sheet 10 of the present invention comprises a substrate 1, and a protective layer 2 which is peelably formed on the substrate 1. These components of the protection layer transfer sheet 10 of the present invention will be explained concretely on an individual basis.

(Substrate)

The substrate 1 is an essential component of the protective layer transfer sheet 10 according to the present invention, and it is provided for the purpose of supporting the protective layer 2, or any layer which may be provided between the substrate 1 and the protective layer 2. The material for the substrate 1 is not particularly limited, however, it is desirable to be able to resist a heat which is added upon the transfer of the protective layer 2 onto a print, and to have a sufficient mechanical strength for handling without a hitch. As such a material for the substrate, various plastic films or sheets, for instance, including, plyesters such as polyethylene terephthalate, polyarylates, polycarbonates, polyurethanes, polyimides, polyether imides, cellulose derivatives, polyethylenes, ethylene-vinyl acetate copolymers, polypropylenes, polystyrenes, polyacrylic resins, polyvinyl chlorides, polyvinylidene chlorides, polyvinyl alcohols, polyvinyl butyrals, nylons, polyether ether ketones, polysulfones, polyether sulfones, tetrafluoroethylene-perfluoroalkyl vinyl ethers, polyvinyl fluorides, tetrafluoroethylene-ethylenes, tetrafluoroethylene hexafluoropropylenes, polychlorotrifluoroethylenes, polyvinylidene fluorides, and the likes, may be enumerated.

Although the thickness of the substrate 1 can be appropriately selected depending on the kind of the material used so as to make it suitable in strength, heat resistance and so on, the thickness is usually in the range of about 2.5 µm-about 100 µm.

(Protective Layer)

On the substrate 1, the protective layer 2 is provided so as to be able to be delaminated from the substrate. The protective layer 2 is an essential component of the protective layer transfer sheet 10 according to the present invention.

In the protective layer 2, as binder resins, (A) one or both of a cellulose ester having a number average molecular weight (Mn) of not less than 15000 and not more than 30000 and a vinyl chloride-vinyl acetate copolymer having a number average molecular weight (Mn) of not less than 15000 and not more than 30000, and (B) a cellulose ester having a number average molecular weight (Mn) of not more than 7000, are included. Hereinafter, the above mentioned (A) one or both of the cellulose ester having a number average molecular weight (Mn) of not less than 15000 and not more than 30000 and the vinyl chloride-vinyl acetate copolymer having a number average molecular weight (Mn) of not less than 15000 and not more than 30000 may be referred to as a "binder resin of the ingredient A", occasionally; and the above mentioned (B) the cellulose ester having a number average molecular weight (Mn) of not more than 7000 may be referred to as a "binder resin of the ingredient B", occasionally.

Incidentally, the number average molecular weight (Mn) used herein denotes a number average molecular weight measured by the gel permeation chromatography (GPC) in terms of polystyrene standard.

In the present invention, the total content of the "binder resin of the ingredient A" and the "binder resin of the ingredient B" to the total solid content in the protective layer 2 is defined as being in the range of not less than 70% by mass. If the total content is less than 70% by mass, even in the case that the content of the "binder resin of the ingredient B" to the total mass of the "binder resin of the ingredient A" and the binder resin of the ingredient B" is set to be not less than 10% by mass and not more than 30% by mass, it is impossible to satisfy sufficiently the intended dyeability, releasing property, and the plasticizer resistance. As for the upper limit thereof, there is no particular limitation, and it may take 100% by mass.

"Binder Resin of the Ingredient A"

In the present invention, the protective layer 2 contains one or both of the cellulose ester having a number average molecular weight (Mn) of not less than 15000 and not more than 30000 and the vinyl chloride-vinyl acetate copolymer having a number average molecular weight (Mn) of not less than 15000 and not more than 30000. In the present invention, by virtue of this "binder resin of the ingredient A", the plasticizer resistance is imparted to the protective layer 2.

When a cellulose ester having a number average molecular weight (Mn) of more than 30000, or a vinyl chloride-vinyl acetate copolymer having a number average molecular weight (Mn) of more than 30000 is used, instead of the "binder resin of the ingredient A", the dyeability of the protective layer becomes lower, and as a result, cases where an image cannot be formed on the protective layer 2 which has been transferred onto the print would arise.

The cellulose ester is a compound in which some of cellulose or all of the cellulose is esterified, and, for instance, cellulose acetate, cellulose propionate (CAP), cellulose butyrate (CAB), and the like may be enumerated. This point is also similar for the cellulose ester having a number average molecular weight (Mn) of not more than 7000 which is the "binder resin of the ingredient B" as described later. Therefore, as the cellulose ester of the "binder resin of the ingredient A", any one of having a number average molecular weight (Mn) of not less than 15000 and not more than 30000 can be used by selecting it appropriately from these cellulose esters, and similarly, as the cellulose ester of the "binder resin of the ingredient B", any one of having a number average molecular weight (Mn) of not more than 7000 can be used by selecting it appropriately from these cellulose esters.

In particular, the cellulose ester having a number average molecular weight (Mn) of not less than 15000 and not more than 30000 is excellent in plasticizer resistance, as compared with the vinyl chloride-vinyl acetate copolymer having a number average molecular weight (Mn) of not less than 15000 and not more than 30000. Further, the cellulose ester having a number average molecular weight (Mn) of this range shows a good compatibility with the "binder resin of the ingredient B". Therefore, the cellulose is preferable in that it can further improve the dyeability and the releasability.

"Binder Resin of the Ingredient B"

In the present invention, the protective layer 2 contains the cellulose ester having a number average molecular weight (Mn) of not more than 7000, in addition to the above mentioned "binder resin of the ingredient A". In the present invention, by virtue of this "binder resin of the ingredient B", the dyeability and the releasability are imparted to the protective layer 2.

When a cellulose ester having a number average molecular weight (Mn) of more than 7000 is used, instead of the "binder resin of the ingredient B", in combination with the "binder resin of the ingredient A", the dyeability and the releasability cannot reach their sufficient levels. As the cellulose ester of the "binder resin of the ingredient B", an arbitrary member can be used as long as it satisfies the condition of having a number average molecular weight (Mn) of not more than 7000, but a preferred lower limit value of the number average molecular weight (Mn) thereof is 3000. When the protective layer 2 is allowed to contain a cellulose ester having a number average molecular weight (Mn) of not less than 3000 and not more than 7000 as the "binder resin of the ingredient B", it can be expected further improvements in the dyeability and the releasability.

The cellulose ester that is the "binder resin of the ingredient B" is different from the aforementioned cellulose ester that is the "binder resin of the ingredient A" in their values of the number average molecular weight (Mn). In the case of using a cellulose ester as the "binder resin of the ingredient A", the cellulose ester to be used as the "binder resin of the ingredient A" and the cellulose ester to be used as the "binder resin of the ingredient B" may be identical except for the molecular weight. Alternatively, they may be different from each other in other respects. For example, it is possible that the cellulose ester of the "binder resin of the ingredient A" is a cellulose acetate propionate (CAP) having a number average molecular weight (Mn) of not less than 15000 and not more than 30000, while the cellulose ester of the "binder resin of the ingredient B" is a cellulose acetate propionate (CAP) having a number average molecular weight (Mn) of not more than 7000. It is also possible that the cellulose ester of the "binder resin of the ingredient A" is a cellulose acetate propionate (CAP) having a number average molecular weight (Mn) of not less than 15000 and not more than 30000, while the cellulose ester of the "binder resin of the ingredient B" is a cellulose acetate butyrate (CAB) having a number average molecular weight (Mn) of not more than 7000.

Further, in the present invention, it is an essential condition that the ratio of the content of the "binder resin of the ingredient B" to the total mass of the "binder resin of the ingredient A" and the "binder resin of the ingredient B" is defined as being not less than 10% by mass and not more than 30% by mass. When the ratio of the content of the "binder resin of the ingredient B" to the total mass of the "binder resin of the ingredient A" and the "binder resin of the ingredient B" is less than 10% by mass, the dyeability and the releasability becomes lower, and as a result, cases where an image cannot be formed on the protective layer 2, or cases where the dye layer and the protective layer are closely stuck to each other on the occasion of forming an image on the protective layer 2 by transferring dyes in the dye layer, which is followed by the breakage of the dye layer and the abnormal transfer where the dye layer is entirely transferred to the protective layer, would arise. On the other hand, when the ratio of the content of the "binder resin of the ingredient B" to the total mass of the "binder resin of the ingredient A" and the "binder resin of the ingredient B" exceeds 30% by mass, the plasticizer resistance which is provided by the "binder resin of the ingredient A" becomes lower, and as a result, cases where the protective layer 2 of the protective layer transfer sheet 10 of the present invention cannot impart the plasticizer resistance of the print to which the protective layer is transferred would arise.

According to the protective layer transfer sheet 10 of the present invention which comprises the protective layer 2 having the above features, it is possible to impart the plasticizer resistance to a print onto which the protective layer 2 is transferred, owing to the plasticizer resistance which is inherently owned by the protective layer 2. Further, it is also possible to form an image onto the protective layer 2 which is provided on the surface of the print, owing to the dyeability which is inherently owned by the protective layer 2. In addition, when the image is further formed onto the protective layer 2, it is possible to prevent the sticking between the protective layer 2 and the dye layer, owing to the releasability which is inherently owned by the protective layer 2, and thus, it is also possible to prevent the abnormal transfer of the dye layer and the breakage of the dye layer on the occasion of forming the image on the protective layer 2.

It is preferable that the protective layer 2 further contains a polyethylene wax having a number average molecular weight (Mn) of not less than 2000 and not more than 3000, in addition to the above mentioned "binder resin of the ingredient A" and the above mentioned "binder resin of the ingredient B". When satisfying this composition, it is possible to impart a high abrasion resistance or rubfastness to the protective layer 2, in addition to the aforementioned effects due to the "binder resin of the ingredient A" and the "binder resin of the ingredient B". Incidentally, in the case that the protective layer 2 contains a polyethylene wax having a number average molecular weight (Mn) of more than 3000, there is a tendency that the plasticizer resistance which is imparted by the "binder resin of the ingredient A" is lowered, while in the case that the protective layer 2 contains a polyethylene wax having a number average molecular weight (Mn) of less than 2000, it is not possible to achieve sufficient improvement in abrasion resistance.

The polyethylene wax having a number average molecular weight (Mn) within the above range can improve the abrasion resistance, even when it is added in a small amount. Therefore, there is no particular limitation on the content of the polyethylene wax having the number average molecular weight (Mn) of the above range. When the ratio of the content of the polyethylene wax to the total solid content in the protective layer 2 is not less than 1% by mass, however, the abrasion resistance cannot be sufficiently satisfied. When the rate exceeds 10% by mass, it cannot be expected to obtain more improvements in the abrasion resistance as the increment of the rate, and there is a tendency that the plasticizer resistance which is imparted by the "binder resin of the ingredient A" is lowered. Therefore, considering these points, it is preferable that the polyethylene wax having a number average molecular weight (Mn) of not less than 2000 and not more than 3000 is contained in the range of not less than 1% by mass and not more than 10% by mass on the basis of the total solid content in the protective layer 2.

Further, when it is intended to improve further the abrasion resistance of the protective layer 2, it is particularly desirable that a fluorine resin is contained in the protective layer 2. When the protective layer 2 contains the fluorine wax in addition to the above mentioned polyethylene wax, it can be expected that the abrasion resistance is further improved as compared with the case that the polyethylene wax having the number average molecular weight of the above range is added alone In addition, since the fluorine resin also excels in transferability at the time of transferring the protective layer 2 from the substrate 1, the transferability of the protective layer 2 from the substrate 1 (which may be also referred to as "peel property") can be more improved according to the protective layer 2 which contains fluorine resin.

As the fluorine resin, conventionally known ones can be appropriately selected and used, for example, polyvinylidene fluoride, tetrafluoroethylene resin, tetrafluoroethylene-perfluoroalkoxy vinyl ether copolymer, tetrafluoroethylene-hexafluoropropylene copolymer, polychlorotrifluoroethylene, tetrafluoroethylene ethylene copolymer, chlorotrifluoroethylene-ethylene copolymer, polyvinyl fluoride (PVF) and the like, are usable.

It is preferable that such a fluorine resin is contained to the protective layer in an amount of not less than 0.5% by mass and not more than 3% by mass on the basis of the total solid content in the protective layer 2. When the resin is contained in an amount of less than 0.5% by mass, it is impossible to sufficiently exert a synergistic effect with the polyethylene wax. When the resin is contained in an amount of exceeding 3% by mass, as is the case with the above mentioned polyethylene wax, the plasticizer resistance tends to decrease.

As described above, with respect to the protective layer 2, the total content of the "binder resin of the ingredient A" and the "binder resin of the ingredient B" to the total solid content in the protective layer 2 is defined as being in the range of not less than 70% by mass. Therefore, as long as this condition is satisfied, the protective layer 2 may contain other ingredient(s). For example, by adding a releasing agent, such as silicone wax, silicone resin, silicone-modified resin, fluorine-modified resin, polyvinyl alcohol, acrylic resin, thermally crosslinkable epoxy-amino resins, thermally crosslinkable alkyd-amino resin, or the like, to the protective layer 2, it is possible to improve the peel property of the protective layer 2 from the substrate 1.

Furthermore, without deviating from the spirit of the present invention, the protective layer 2 may contain a cellulose ester or vinyl chloride-vinyl acetate copolymer, the number average molecular weight of which is more than 30000, or more than 7000 and less than 30000, to the protective layer.

Further, the protective layer 2 may contain any of known thermoplastic resins and thermosetting resins which have been used in the protective layer (which is also referred to as "peel layer" occasionally) of the conventional protective layer transfer sheet, in addition to the aforementioned "binder resin of the ingredient A" and the aforementioned "binder resin of the ingredient B".

There is no particular limitation for the method of forming the protective layer 2, and, for instance, the protective layer 2 can be formed by preparing a coating solution for the protective layer where the "binder resin of the ingredient A" and the "binder resin of the ingredient B", and optionally, the polyethylene wax, fluorine resin, and/or any other additives, are dispersed or dissolved in an appropriate solvent, coating thus prepared coating solution on the substrate 1 in accordance with a coating method such as gravure coating, gravure reverse coating, etc., and then drying the coated solution. Although there is no particular limitation for the thickness of the protective layer 2, it is preferable that the thickness is about 0.5 $g/m^2$-about 10 $g/m^2$, more desirably, about 0.8 $g/m^2$-about 2.0 $g/m^2$.

(Adhesive Layer)

Further, as shown in FIG. 1, it is possible to provide an adhesive layer 3 on the protective layer 2, in order to improve the adhesion to the print, for example, the adhesion to a dye-receiving layer of a thermal transfer image-receiving sheet. Here, the adhesive layer 3 is an optional structure in the protective layer transfer sheet 10 according to the present invention, and is sometimes referred to as "heat-seal layer". Incidentally, if a certain measure to satisfy the adhesion between a print and the protective layer to be transferred onto the print is taken on the print's side, the adhesive layer is not necessarily provided on the protective layer 2, and further, the protective layer 2 itself does not necessarily have adhesive property.

There is no particular limitation on the binder resin composing the adhesive layer 3, and it can be appropriately selected and used from conventionally known ones which have been used in the adhesive layer of the conventional protective layer transfer sheet 10. For example, as the binder resin of the adhesive layer 3, known heat-sensitive adhesives, acrylic resins, vinyl chloride-vinyl acetate copolymer resins, epoxy resins, polyester resins, polycarbonate resins, butyral resins, polyamide resins, vinyl chloride resins, etc., can be enumerated.

There is no particular limitation for the method of forming the adhesive layer, and, for instance, the adhesive layer can be formed by preparing a coating solution for the adhesive layer where one or more of the binder resins as exemplified above, and optionally, an ultraviolet absorber, an antioxidant, a fluorescent whitening agent, an inorganic or organic filler component, a surfactant, and/or a releasing agent, etc., are dispersed or dissolved in an appropriate solvent, coating thus prepared coating solution on the protective layer 2 or an inorganic minute particles' layer described later 1 in accordance with a coating method such as gravure coating, gravure reverse coating, etc., and then drying the coated solution. Although there is no particular limitation for the thickness of the adhesive layer, it is preferable that the thickness is about 0.5 g/m²-about 10 g/m², more desirably, about 0.8 g/m²-about 2.0 g/m².

(Inorganic Minute Particles' Layer)

Further, it is preferable that an inorganic minute particles' layer containing inorganic minute particles and a binder resin (not shown) is provided on the protective layer. The inorganic minute particles' layer provided on the protective layer is a layer which is to be transferred onto the print together with the protective layer, and which comes in contact directly or indirectly with the print when the transfer of the protective layer is carried out. For instance, in the case that the optional adhesive layer as mentioned above is provided onto the inorganic minute particles' layer, the inorganic minute particles' layer is in contact with the print indirectly via the adhesive layer.

According to the protective layer transfer sheet of an embodiment of the present invention where the inorganic minute particles' layer is provided on the protective layer 2, further improvement in the dyeability of the protective layer 2 can be realized, and it becomes possible to form an image with a higher density on the protective layer 2. Although the mechanism of the improvement in dyeability of the protective layer 2 by providing the inorganic minute particles' layer on the protective layer 2 has not been clarified yet, the dyeability of the protective layer 2 is, assumedly, improved by bringing a state that the heat applied by a heating means such as a thermal head can be sufficiently retained within the protective layer by means of the presence of the inorganic minute particles' layer. In other words, it is presumed that the inorganic minute particles' layer plays a role in preventing the heat applied to the protective layer from diffusing to the substrate side.

As the inorganic minute particles which are contained in the inorganic minute particles' layer, for example, colloidal silica, alumina sol, colloidal alumina, cationic aluminum oxide or hydrates thereof, pseudo-boehmite, aluminum silicate, magnesium silicate, magnesium carbonate, magnesium oxide, titanium oxide, etc., can be enumerated. Among them, colloidal silica, and alumina sol are preferred. The detailed mechanism why the colloidal silica and the alumina sol are preferred has not been clarified yet. However, since the alumina sol and the colloidal silica have a tendency of showing a high thermal conductivity as compared with other inorganic minute particles, it is presumed that this high thermal conductivity contributes to the improvement of dye dyeability.

When using the protective layer transfer sheet where the inorganic minute particles' layer is provided on the protective layer 2 and transferring the inorganic minute particles' layer and the protective layer 2 onto the print, the inorganic minute particles' layer comes to lie between the print and the protective layer 2. Here, in the case that the inorganic minute particles' layer contains mainly inorganic minute particles the primary particle size of which exceeds 10 μm, there is a tendency that transparency of the inorganic minute particles' layer is lowered. Along with the lowering of the transparency of the inorganic minute particles, with respect to the print after the protective layer transfer, the transparency of the protective layer 2 lying on the inorganic minute particles' layer also becomes lower. Thus, it is preferable that the inorganic minute particles' layer contains mainly inorganic minute particles the primary particle size of which is not more than 10 μm. Here, the word "mainly" means to be more than 50% by mass on the basis of the total mass of the inorganic minute particles contained in the inorganic minute particles' layer. Although there is no particular limitation on the preferred lower limit of the inorganic minute particles, it may be about 0.1 μm in primary particle size.

The inorganic minute particles' layer functions to improve the dyeability of the protective layer 2. In addition, in the case that no adhesive layer is provided on the inorganic minute particles' layer, the inorganic minute particles' layer also functions as a layer for improving adhesion between the print and the protective layer. On the other hand, in the case that the adhesive layer 3 as described above is provided on the inorganic minute particles' layer, the inorganic minute particles' layer functions as a primer layer for improving the bonding force between the protective layer 2 and the adhesive layer 3. Thus, the binder resin contained in the inorganic minute particles' layer is preferably the one which can satisfy the adhesiveness to the print, or the bonding force between the protective layer 2 and the adhesive layer 3. As such a binder resin, urethane resins, polyester resins, polyvinyl pyrrolidone resins, polyamide epoxy resins, polyvinyl alcohol resins, and the like can be enumerated.

There is no particular limitation on the contents of the inorganic minute particles and the binder resin in the inorganic minute particles' layer, however, it is desirable that the content of the inorganic minute particles is in the range of not less than 5% by mass and not more than 95% by mass on the basis of the total mass of the inorganic minute particles and a binder resin, and more particularly, in the range of not less than 10% by mass and not more than 40% by mass on the basis of the total mass of the inorganic minute particles and a binder resin. When the content of the inorganic minute particles is adjusted to be within this range, it is possible to further improve the dyeability of the protective layer 2.

There is no particular limitation for the method of forming the inorganic minute particles' layer, and, for instance, the inorganic minute particles' layer can be formed by preparing a coating solution for the inorganic minute particles' layer where one or more of the binder resins as exemplified above and the inorganic minute particles, and optionally, any additives as necessary, are dispersed or dissolved in an appropriate solvent, coating thus prepared coating solution on the protective layer 2 in accordance with a known coating method such as gravure coating, gravure reverse coating, etc., and then drying the coated solution. Although there is no particular limitation for the thickness of the inorganic minute particles' layer, it is preferable that the thickness is about 0.1 μm-about 5 μm.

(Release Layer)

Between the substrate 1 and the protective layer 2, a release layer (not shown) may be provided in order to improve the transferability of the protective layer 2. Incidentally, the release layer is an optional layer in the protective layer transfer sheet 10 of the present invention. As a resin for composing the release layer, for example, waxes, silicone waxes, silicone resins, silicone-modified resins, fluorine resins, fluorine-modified resins, polyvinyl alcohols, acrylic resins, thermally crosslinkable epoxy-amino resins and thermally crosslinkable alkyd-amino resins, and the like, are exemplified. Furthermore, the release layer may be comprised of a kind of resin, or two or more kinds of resins. The release layer may be a be formed by using a cross-linking agent such as an isocyanate compound, or the like, and a catalyst such as a tin-based catalyst, an aluminum-based catalyst, or the like, in addition to the releasing resin. In general, the thickness of the release layer may be about 0.5 μm to about 5 μm.

(Back Face Layer)

As shown in FIG. 1, a back face layer 4 may be provided on a surface of the substrate 1 which is different from another surface on which the protective layer 2 is provided, in order to improve the heat resistance, and to give driving stability to a thermal head on printing. Incidentally, the back face layer 4 is an optional component in the protective layer transfer sheet 10 of the present invention.

The back face layer 4 can be formed by selecting any conventionally known thermoplastic resin as appropriate. As such a thermoplastic resin, for instance, polyester type resins, polyacrylic ester type resins, polyvinyl acetate type resins, styrene acrylate type resins, polyurethane type resins, polyolefin type resins such as polyethylene type resins and polypropylene type resins, polystyrene type resins, polyvinyl chloride type resins, polyether type resins, polyamide type resins, polyimide type resins, polyamide-imide type resins, polycarbonate type resins, polyacrylamide type resins, polyvinyl chloride resins, polyvinyl butyral resins, and polyvinyl acetal resins, and silicone-modified forms of these thermoplastic resins may be enumerated. Among them, from the viewpoint of heat resistance, polyamide-imide resin and its silicone-modified form, or the like is desirable.

Furthermore, the back face layer 4 may preferably contain various additives, such as, a releasing agent such as waxes, higher fatty acid amides, phosphoric acid ester compounds, metal soaps, silicone oils, surfactants, etc., an organic powder such as fluorine resin powders, and/or an inorganic compounds such as silica, clay, talc, calcium carbonate, etc, in addition to the thermoplastic resin, for the purpose of improving the slipping property. Particularly, it is preferable to include at least one of phosphoric acid ester compounds and metal soaps.

Figure 2:
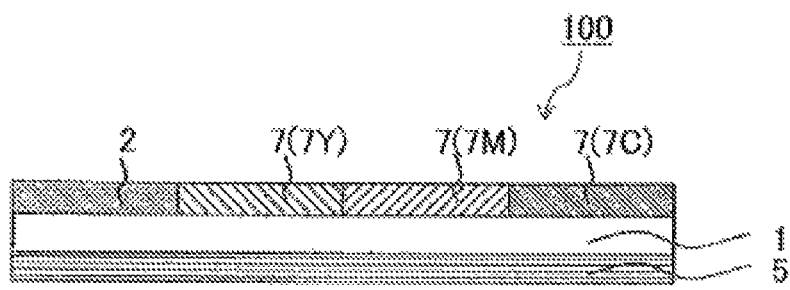
FIG. 2 is a schematic sectional view showing an embodiment of the protective layer transfer sheet according to the present invention.

The back face layer can be formed by preparing a coating solution for the back face layer where one or more of the thermoplastic resin as mentioned above, and optionally, any additives as necessary, are dispersed or dissolved in an appropriate solvent, coating thus prepared coating solution on the substrate 1 in accordance with a known coating procedure such as the gravure printing method, the screen printing method, the reverse roll coating printing method using a gravure plate, or the like, and then drying the coated solution. From the viewpoint of improvement of heat resistance and so on, it is preferable that the thickness of the back face layer 4 is about $0.1$ $g/m^2$-about $5$ $g/m^2$, and, more desirably, about $0.3$ $g/m^2$-about $2.0$ $g/m^2$ As described above, the protective layer transfer sheet according to the present invention is fairly explained. However, without deviating from the scope and the spirit of the present invention, various embodiments other than the ones as disclosed above can be taken in the present invention. For example, as shown in FIG. 2, the protective layer transfer sheet according to the present invention can be also constructed as a dye layers' integral type protective layer transfer sheet 100, wherein dye layers 7 are provided on the same surface of the substrate 1 as the protective layer 2 is provided on, so as to the dye layers are layered in parallel on the substrate across the surface of the substrate, as being frame sequentially. Incidentally, the protective layer transfer sheet according to the embodiment shown in FIG. 2 takes a construction, where a yellow dye layer 7Y, a magenta dye layer 7M, a cyan dye layer 7C are provided in this order as being frame sequentially, on the same surface of the substrate 1 as the protective layer 2 is provided on.

As the dye layers 7 of the dye layers' integral type protective layer transfer sheet 100, the ones which has been known as the dye layers of the conventional thermal transfer sheet can be applied as they are.

As the binder resin contained in the dye layers 7, for instance, for instance, cellulosic type resins such as ethyl cellulose resin, hydroxyethyl cellulose resin, ethylhydroxy cellulose resin, methylcellulose resin, cellulose acetate resin, and so on; vinyl type resins such as polyvinyl alcohol resin, polyvinyl acetate resin, polyvinyl butyral resin, polyvinyl acetal resin, polyvinyl pyrrolidone, and so on; acrylic type resins such as poly(meth)acrylate, poly(meta)acryl amide, and so on; polyurethane type resins; polyamide type resins; polyester type resins; and the like, can be enumerated.

Among the above exemplified binder resins, polyvinyl acetal and polyvinyl butyral each has a good compatibility with the protective layer 2 of the protective layer transfer sheet of the present invention, and thus, they bring a further improving effect on the releasability of the protective layer to the dye layer, which is given to the protective layer 2 by the "binder resin of the ingredient B". Therefore, according to the dye layers' integral type protective layer transfer sheet, wherein the dye layers 7 which each contains polyvinyl acetal or polyvinyl butyral, and the protective layer 2 are provided as being frame sequentially, when the protective layer 2 of the dye layers' integral type protective layer transfer sheet is transferred onto the print and then each individual dye layers 7 of the dye layers' integral type protective layer transfer sheet are superimposed onto the transferred protective layer 2 in order to form an image on the protective layer 2, it becomes possible to form the image on the protective layer 2 while exhibiting a particularly good releasability between the dye layers 7 and the protective layer 2.

As the dyes for the dye layers 7, for example, the ones which possess an adequate coloring density, and which can be hardly discolored or faded by light, heat, or temperature are preferable. Examples of such dyes include diarylmethane type dyes; triarylmethane type dyes; thiazole type dyes; merocyanine dyes; pyrazolone dyes; methine type dyes; indoaniline type dyes; azomethine type dyes such as acetophenone azomethine, pyrazolo azomethine, imidazole azomethine, imidazo azomethine, and pyridone azomethine, etc.; xanthene type dyes; oxazine type dyes; cyanostyrene type dyes such as dicyanostyrene and tricyanostyrene, etc.; thiazine type dyes; azine type dyes; acridine type dyes; benzeneazo type dyes; azo type dyes such as, pyridoneazo, thiopheneazo, isothiazoleazo, pyrroleazo, pyrazoleazo, imidazoleazo, thiadiazoleazo, triazoleazo, and disazo, etc.; spiropyran type dyes; indolinospiropyran type dyes; fluoran type dyes; rhodaminelactam type dyes; naphthoquinone type dyes; anthraquinone type dyes; and quinophthalone type dyes. Concretely, red dyes such as MSRedG (manufactured by Mitsui Toatsu Chemicals, Inc.), Macrolex Red Violet R (manufactured by Bayer), CeresRed 7B (manufactured by Bayer), Samaron Red F3BS (manufactured by Mitsubishi Chemical Co., Ltd.); yellow dyes such as Holon brilliant yellow 6GL (manufactured by Clariant), PTY-52 (manufactured by Mitsubishi Chemical Industries, Ltd.), MACROLEX Yellow 6G (manufactured by Bayer); blue dyes such as Kayaset Blue 714 (manufactured by Nippon Kayaku Co., Ltd.), Waxoline Blue AP-FW (manufactured by ICI), Holon Brilliant Blue S-R (manufactured by Sandoz), MS Blue 100 (manufactured by Mitsui Toatsu Chemical Co., Ltd.), C. I. Solvent Blue 22; etc., are exemplified.

(Article for Receiving Transfer)

As a transfer receiving article which may be used for the transfer of the protective layer transfer sheet 10, 100 as described above, any materials known in this art, such as plain paper, high quality paper, tracing paper, plastic film, etc., are enumerated and the material to be used is not particularly limited. Incidentally, the "print" used herein means an object in which an image is formed on this transfer receiving article by using a thermal transfer sheet.

Formation of above mentioned print can be carried out by superimposing a dye layer of the conventionally known thermal transfer sheet onto the transfer receiving article, and then applying heat to the superimposed one from the back side of the thermal transfer sheet with using a heating device such as a thermal head.

Further, the formation of the protective layer 2 onto the print can be carried out by superimposing the protective layer transfer sheet 10, 100 of the present invention onto the print where the image has been formed as mentioned above, and then applying heat to the superimposed one from the back side of the protective layer transfer sheet 10, 100 with using a heating device such as a thermal head. Here, since the protective layer 2 according to the present invention excels in the plasticizer resistance, it is possible to impart the plasticizer resistance to the print where the protective layer 2 is formed on the surface thereof.

Furthermore, the formation of another image onto the protective layer 2 formed on the print can be carried out by superimposing a dye layer of the conventionally known thermal transfer sheet onto the protective layer 2, and then applying heat to the superimposed one from the back side of the thermal transfer sheet with using a heating device such as a thermal head. Here, since the protective layer 2 according to the present invention excels in the dye dyeability and the releasability, it is possible to form an image onto the protective layer 2 without causing the abnormal transfer of the dye layers to be used and the breakage of the dye layers, which problems are due to the closely sticking between the dye layers and the protective layer when forming the image onto the protective layer 2.

In addition, according to the dye layers' integral type protective layer transfer sheet 100 as a modified embodiment of the present invention as described above, it is possible, (i) to obtain a print where an image is formed on the transfer receiving article, (ii) to form the protective layer 2 onto the print, and (iii) to form another image onto the protective sheet provided onto the print, with using this dye layers' integral type protective layer transfer sheet 100.

EXAMPLE

Hereinafter, the present invention will be described with referring to Examples and Comparative Examples. Herein, simplified expressions of "part(s)" in this specification mean "part(s) by mass", unless otherwise especially mentioned. Also, the abbreviation "Mn" used herein means the number average molecular weight.

Example 1

As a substrate, polyethylene terephthalate film which had 5 μm in thickness was used. On one surface of this substrate, a coating liquid for forming protective layer having the following composition was coated so as to obtain a protective layer having a thickness of 2 μm in a dried state. Then, a coating liquid for forming adhesive layer having the following composition was coated on the protective layer so as to obtain an adhesive layer having a thickness of 3 μm in a dried state. On other surface of the substrate, a coating liquid for forming back face layer 1 having the following composition was coated so as to obtain a back face layer having a thickness of 3 μm in a dried state. Thus, a protective layer transfer sheet of Example 1 was prepared.

| (Coating liquid for forming protective layer 1) | |
|---|---|
| Cellulose acetate propionate (Mn: 15000) (CAP504-0.2, manufactured by Eastman Chemical Company, Ltd.) | 70 parts |
| Cellulose acetate butyrate (Mn: 6000) (Solus 2100, manufactured by Eastman Chemical Company) | 10 parts |
| Methyl ethyl ketone/toluene (mass ratio 1:1) | 700 parts |

| (Coating liquid for forming adhesive layer) | |
|---|---|
| Polyester resin (VYLON 220, manufactured by Toyobo Co., Ltd.) | 20 parts |
| Ultraviolet absorber linked copolymer resin (UVA-635L, manufactured by BASF) | 10 parts |
| Methyl ethyl ketone/toluene (mass ratio 1:1) | 80 parts |

| (Coating liquid for forming back face layer) | |
|---|---|
| Polyvinyl butyral resin (S-LEC BX-1, manufactured by Sekisui Chemical Co., Ltd.) | 13.6 parts |
| Polyisocyanate curing agent (TAKENATE D218, manufactured by Takeda Pharmaceutical Company Limited) | 0.6 part |
| Phosphoric ester (PLY SURF A208N, manufactured by Dai-ichi Kogyo Seiyaku, Co., Ltd.) | 0.8 part |
| Methyl ethyl ketone | 42.5 parts |
| Toluene | 42.5 parts |

Example 2

The same procedure as described in Example 1 was repeated, except for replacing the coating liquid for forming protective layer 1 with a coating liquid for forming protective layer 2 having the following composition, in order to prepare a protective layer transfer sheet of Example 2.

| (Coating liquid for forming protective layer 2) | |
|---|---|
| Cellulose acetate propionate (Mn: 15000) (CAP504-0.2, manufactured by Eastman Chemical Company, Ltd.) | 90 parts |
| Cellulose acetate butyrate (Mn: 6000) (Solus 2100, manufactured by Eastman Chemical Company) | 10 parts |
| Methyl ethyl ketone/toluene (mass ratio 1:1) | 700 parts |

Example 3

The same procedure as described in Example 1 was repeated, except for replacing the coating liquid for forming protective layer 1 with a coating liquid for forming protective layer 3 having the following composition, in order to prepare a protective layer transfer sheet of Example 3.

| (Coating liquid for forming protective layer 3) | |
|---|---|
| Cellulose acetate propionate (Mn: 25000) (CAP482-0.5, manufactured by Eastman Chemical Company, Ltd.) | 70 parts |

-continued

| (Coating liquid for forming protective layer 3) | |
|---|---|
| Cellulose acetate butyrate (Mn: 6000)<br>(Solus 2100, manufactured by Eastman Chemical Company) | 30 parts |
| Methyl ethyl ketone/toluene (mass ratio 1:1) | 700 parts |

Example 4

The same procedure as described in Example 1 was repeated, except for replacing the coating liquid for forming protective layer 1 with a coating liquid for forming protective layer 4 having the following composition, in order to prepare a protective layer transfer sheet of Example 4.

| (Coating liquid for forming protective layer 4) | |
|---|---|
| Vinyl chloride - vinyl acetate copolymer (Mn: 28000)<br>(Solbin TA5R, manufactured by Nissin Chemical Industry Co., Ltd.) | 70 parts |
| Cellulose acetate butyrate (Mn: 6000)<br>(Solus 2100, manufactured by Eastman Chemical Company) | 30 parts |
| Methyl ethyl ketone/toluene (mass ratio 1:1) | 700 parts |

Example 5

The same procedure as described in Example 1 was repeated, except for replacing the coating liquid for forming protective layer 1 with a coating liquid for forming protective layer 5 having the following composition, in order to prepare a protective layer transfer sheet of Example 5.

| (Coating liquid for forming protective layer 5) | |
|---|---|
| Cellulose acetate propionate (Mn: 15000)<br>(CAP504-0.2, manufactured by Eastman Chemical Company, Ltd.) | 80 parts |
| Cellulose acetate butyrate (Mn: 6000)<br>(Solus 2100, manufactured by Eastman Chemical Company) | 20 parts |
| Polyethylene wax (Mn: 2000)<br>(T-10P-2, manufactured by Gifu Shellac Manufacturing Co., Ltd.) | 3 parts |
| Methyl ethyl ketone/toluene (mass ratio 1:1) | 700 parts |

Example 6

The same procedure as described in Example 1 was repeated in order to prepare a protective layer transfer sheet of Example 6, except for coating the coating liquid for forming protective layer 5 having the above composition in place of the coating liquid for forming protective layer 1 to form a protective layer, then coating a coating liquid for forming minute particles' layer having the following composition onto the obtained protective layer and drying it to form an inorganic minute particles' layer, and thereafter, forming the adhesive layer onto the inorganic minute particles' layer. Here, the coating amount of the coating liquid for forming minute particles' layer was 0.1 g/m² in a dried state.

| (Coating liquid for forming minute particles' layer) | |
|---|---|
| Urethane resin (solid content: 35%)<br>(F-2850D, manufactured by Dai-ichi Kogyo Seiyaku, Co., Ltd.) | 10 parts |
| Alumina sol (solid content: 10%)<br>(Alumina sol 200, manufactured by Nissan Chemical Industries, Ltd.) | 15 parts |
| Water | 37.5 parts |
| IPA (isopropyl alcohol) | 37.5 parts |

Comparative Example 1

The same procedure as described in Example 1 was repeated, except for replacing the coating liquid for forming protective layer 1 with a coating liquid for forming protective layer A having the following composition, in order to prepare a protective layer transfer sheet of Comparative Example 1.

| (Coating liquid for forming protective layer A) | |
|---|---|
| Cellulose acetate propionate (Mn: 15000)<br>(CAP504-0.2, manufactured by Eastman Chemical Company, Ltd.) | 60 parts |
| Cellulose acetate butyrate (Mn: 6000)<br>(Solus 2100, manufactured by Eastman Chemical Company) | 40 parts |
| Methyl ethyl ketone/toluene (mass ratio 1:1) | 700 parts |

Comparative Example 2

The same procedure as described in Example 1 was repeated, except for replacing the coating liquid for forming protective layer 1 with a coating liquid for forming protective layer B having the following composition, in order to prepare a protective layer transfer sheet of Comparative Example 2.

| (Coating liquid for forming protective layer A) | |
|---|---|
| Cellulose acetate propionate (Mn: 75000)<br>(CAP482-20, manufactured by Eastman Chemical Company, Ltd.) | 70 parts |
| Cellulose acetate butyrate (Mn: 6000)<br>(Solus 2100, manufactured by Eastman Chemical Company) | 30 parts |
| Methyl ethyl ketone/toluene (mass ratio 1:1) | 700 parts |

Comparative Example 3

The same procedure as described in Example 1 was repeated, except for replacing the coating liquid for forming protective layer 1 with a coating liquid for forming protective layer C having the following composition, in order to prepare a protective layer transfer sheet of Comparative Example 3.

| (Coating liquid for forming protective layer C) | |
|---|---|
| Cellulose acetate butyrate (Mn: 65000)<br>(CAB171-15, manufactured by Eastman Chemical Company, Ltd.) | 70 parts |
| Cellulose acetate butyrate (Mn: 6000)<br>(Solus 2100, manufactured by Eastman Chemical Company) | 30 parts |
| Methyl ethyl ketone/toluene (mass ratio 1:1) | 700 parts |

(Formation of Print)

On each thermal transfer image-receiving sheet prepared by the following procedure, a print was formed by printing a black solid image consisting of yellow, magenta, and cyan dyes, using a thermal printer 1 mentioned below. As the yellow, magenta, and cyan dyes, a thermal transfer sheet which was prepared in the following manner was used.

(Preparation of Thermal Transfer Image-Receiving Sheet)

On a porous film layer made of a porous polyethylene film (Toyopearl-SS P4255, manufactured by Toyobo Co., Ltd., thickness: 35 μm), a coating liquid for forming intermediate layer having the following composition, and a coating liquid for forming dye-receiving layer having the following composition, were coated and then dried in that order in accordance with the gravure reverse coating method, in order to form an intermediate layer and a dye-receiving layer. On another side surface of the porous polyethylene film which was opposite to the surface onto which the intermediate layer and the dye-receiving layer were formed, a coating liquid for forming adhesive layer having the following composition was coated and then dried in accordance with the three-reverse rolls coating method, in order to form an adhesive layer. Then, this adhesive layer side of the porous film was adhered to RC paper (155 g/m², 151 μm in thickness, manufactured by Mitsubishi Paper Mills) so as to form a thermal transfer image-receiving sheet. With respect to the coated amount of the above intermediate layer, die-receiving layer, and adhesive layer were 1.5 g/m², 5.0 g/m², and 5 g/m² in a dried state, respectively.

| (Coating liquid for forming intermediate layer) | |
|---|---|
| Polyester resin (Polyester WR-905, manufactured by The Nippon Synthetic Chemical Industry Co., Ltd.) | 50 parts |
| Titanium oxide (TCA888, manufactured by Tochem Products) | 20 parts |
| Fluorescent whitening agent (Uvitex BAC, manufactured by Ciba Specialty Chemicals Inc.) | 1.2 parts |
| Water/isopropyl alcohol (mass ratio 1:1) | 28.8 parts |

| (Coating liquid for forming dye-receiving layer) | |
|---|---|
| Vinyl chloride - vinyl acetate copolymer (SOLBIN C, manufactured by Nissin Chemical Industry Co., Ltd.)) | 60 parts |
| Epoxy - modified silicone (X-22-3000T, manufactured by Shin-Etsu Chemical Co., Ltd.) | 1.2 parts |
| Metylstyl - modified silicone (X-24-510, manufactured by Shin-Etsu Chemical Co., Ltd.) | 0.6 parts |
| Methyl ethyl ketone/toluene (mass ratio 1:1) | 5 parts |

| (Coating liquid for forming adhesive layer) | |
|---|---|
| Urethane resin (TAKELAC A-969V, manufactured by Mitsui Takeda Chemical Inc.) | 30 parts |
| Isocyanate (TAKENATE, manufactured by Mitsui Takeda Chemical Inc.) | 10 parts |
| Ethyl acetate | 60 parts |

(Preparation of Thermal Transfer Sheet)

As a substrate, polyethylene terephthalate film which underwent easy-adhesive treatment in advance, and has 4.5 μm in thickness was used. On this substrate, a coating liquid for forming heat-resistant lubricating layer having the following composition was coated so as to obtain a coating amount of 0.8 g/m² in a dried state, thereby a heat-resistant lubricating layer was formed. Then, on the reverse surface side of the substrate, a coating liquid for forming yellow dye layer, a coating liquid for forming magenta dye layer, and a coating liquid for forming cyan dye layer were coated in this order as being frame sequentially, so as to obtain each individual coating amount of 0.6 g/m² in a dried state, thereby the dye layers were formed. Ultimately, a thermal transfer sheet was prepared.

| (Coating liquid for forming heat-resistant lubricating layer) | |
|---|---|
| Polyvinyl butyral resin (S-LEC BX-1, manufactured by Sekisui Chemical Co., Ltd.) | 2.0 parts |
| Polyisocyanate (BURNOCK D750, manufactured by DIC Corporation) | 9.2 parts |
| Phosphoric ester type surfactant (PLY SURF A208N, manufactured by Dai-ichi Kogyo Seiyaku, Co., Ltd. ) | 1.3 parts |
| Talc (MICRO ACE P-3, manufactured by Nippon Talc Co., Ltd.) | 0.3 parts |
| toluene | 43.6 parts |
| methyl ethyl ketone | 43.6 parts |

| (Coating liquid for forming yellow dye layer) | |
|---|---|
| Disperse Yellow 201 | 4.0 parts |
| polyvinyl acetal resin (S-LEC KS-5, manufactured by Sekisui Chemical Co., Ltd.) | 3.5 parts |
| Polyethylene wax | 0.1 part |
| Methyl ethyl ketone | 45.0 parts |
| Toluene | 45.0 parts |

| (Coating liquid for forming magenta dye layer) | |
|---|---|
| Disperse Red 60 | 1.5 parts |
| Disperse Violet 26 | 2.0 parts |
| polyvinyl acetal resin (S-LEC KS-5, manufactured by Sekisui Chemical Co., Ltd.) | 4.5 parts |
| Polyethylene wax | 0.1 part |
| Methyl ethyl ketone | 45.0 parts |
| Toluene | 45.0 parts |

| (Coating liquid for forming cyan dye layer) | |
|---|---|
| Solvent Blue 63 | 2.0 parts |
| Disperse Blue 354 | 2.0 parts |
| polyvinyl acetal resin (S-LEC KS-5, manufactured by Sekisui Chemical Co., Ltd.) | 3.5 parts |
| Polyethylene wax | 0.1 part |
| Methyl ethyl ketone | 45.0 parts |
| Toluene | 45.0 parts |

<Thermal Printer 1>

Gradation control method: Multi-pulse mode which can adjust the number of divided pulses having a pulse length obtained by equally dividing the one line cycle into 256, from 0 to 255

Thermal head: KEE-57-12GAN2-STA (manufactured by KYOCERA Corporation)
  Average resistance of heating element: 3303 (Ω)
  Print density in main scanning direction: 300 dpi
  Print density in sub scanning direction: 300 dpi
  Print Voltage: 22.5 (V)
  One line cycle; 5 (msec.)
  Print starting temperature; 35 (° C.)
  Pulse duty: 85%
(Transfer of the Protective Layer)

With respect to the protective layer transfer sheets of Examples and Comparative Examples, under the following conditions, the protective layer of each protective layer transfer sheet was transferred onto the dye receiving layer of the print which had been prepared as mentioned above, using a thermal printer 2 mentioned below. Thereby, image formed articles of each individual Examples and Comparative Examples in which the protective layer was transferred onto the print were obtained.

<Thermal Printer 2>

Gradation control method: Multi-pulse mode which can adjust the number of divided pulses having a pulse length obtained by equally dividing the one line cycle into 256, from 0 to 255
  Thermal head: KEE-57-12GAN2-STA (manufactured by KYOCERA Corporation)
  Average resistance of heating element: 3303 (Ω)
  Print density in main scanning direction: 300 dpi
  Print density in sub scanning direction: 300 dpi
  Print voltage: 18 (V)
  One line cycle; 3.0 (msec.)
  Print starting temperature; 35 (° C.)
  Pulse duty: 85%
(Evaluation of Plasticizer Resistance)

Polyvinyl chloride sheet which contained a plasticizer (ARUTRON #480, manufactured by Mitsubishi Chemical Corporation) was superposed on the protective layer transferred surface of each individual image formed article. The superposed materials were kept for 12 hours under an environment of 50° C. while applying a load of 24 g/cm² onto the individual superposed materials. After the time elapsed, the image formed articles were observed about the degradation of the image of the print due to the plasticizer by visually. Evaluation of plasticizer resistance was done under the following evaluation criteria. The evaluation results of the plasticizer resistance are shown in Table 1.

<Evaluation Criteria>
⊚: The dye did not migrate at all.
◯: The dye migrated very slightly
Δ: The dye migration was recognized as a certain extent.
x: The dye migrated in almost all area.
(Evaluation of Dyeability)

On the protective layer of each individual image formed article, a Bk of gradation pattern (0 to 255 gray scales) was printed under the same conditions as above mentioned printing condition, and then concentration of the obtained printed pattern was measured. Evaluation of the dyeability was performed under the following evaluation criteria. The evaluation results are shown in Table 1.

<Concentration Colorimetric Conditions>

Colorimeter: spectrometer, SpectroLino (manufactured by Gretag Macbeth Co., Ltd.)
  Filter for concentration measurement: ANSI Status A <Evaluation Criteria>
⊚: 255 gray scales concentration of Bk was not less than 1.8.
◯: 255 gray scales concentration of Bk was not less than 1.5 and less than 1.8.
Δ: 255 gray scales concentration of Bk was not less than 1.0 and less than 1.5.
x: 255 gray scales concentration of Bk was less than 1.0.

(Evaluation of Releasability)

On the protective layer of each individual image formed article, a Bk of gradation pattern (0 to 255 gray scales) was printed under the same conditions as above mentioned printing condition, and the abnormal transfer during the time when the dye layers were peeled off from the protective layer in that printing was checked visually. Evaluation of releasability was performed under the following evaluation criteria. The evaluation results are shown in Table 1.

<Evaluation Criteria>
◯: It was possible to peel off the dye layers without causing abnormal transfer in all levels of the gradation.
Δ: Abnormal transfer was slightly caused in a part of gradation levels.
x: Abnormal transfer was caused completely in some (or all) of gradation levels.

TABLE 1

|  | Plasticizer resistance | Dyeability | Releasability |
|---|---|---|---|
| Example 1 | ⊚ | ◯ | ◯ |
| Example 2 | ⊚ | ◯ | ◯ |
| Example 3 | ⊚ | ◯ | ◯ |
| Example 4 | ◯ | ◯ | ◯ |
| Example 5 | ⊚ | ◯ | ◯ |
| Example 6 | ⊚ | ⊚ | ◯ |
| Comparative example 1 | X | ◯ | ◯ |
| Comparative example 2 | ⊚ | X | X |
| Comparative example 3 | ⊚ | X | X |

Next, in order to verify the effect in the scratch resistance by addition of polyethylene wax and fluorine resin, protective layer transfer sheets of the following examples 7-12 were further prepared, and they were evaluated for the scratch resistance. Incidentally, the evaluation results of the protective layer transfer sheets of Examples 7 to 12 for the plasticizer resistance, dyeability, and releasability were the same with the results of the protective layer transfer sheet of Example 1.

Example 7

The same procedure as described in Example 1 was repeated, except for replacing the coating liquid for forming protective layer 1 with a coating liquid for forming protective layer 7 having the following composition, in order to prepare a protective layer transfer sheet of Example 7.

| (Coating liquid for forming protective layer 7) | |
|---|---|
| Cellulose acetate propionate (Mn: 15000) (CAP504-0.2, manufactured by Eastman Chemical Company, Ltd.) | 70 parts |
| Cellulose acetate butyrate (Mn: 6000) (Solus 2100, manufactured by Eastman Chemical Company) | 30 parts |
| Polyethylene wax (Mn: 2000) (T-10P-2, manufactured by Gifu Shellac Manufacturing Co., Ltd.) | 3 parts |
| Methyl ethyl ketone/toluene (mass ratio 1:1) | 700 parts |

Example 8

The same procedure as described in Example 1 was repeated, except for replacing the coating liquid for forming protective layer 1 with a coating liquid for forming protective layer 8 having the following composition, in order to prepare a protective layer transfer sheet of Example 8.

| (Coating liquid for forming protective layer 8) | |
|---|---|
| Cellulose acetate propionate (Mn: 15000) (CAP504-0.2, manufactured by Eastman Chemical Company, Ltd.) | 70 parts |
| Cellulose acetate butyrate (Mn: 6000) (Solus 2100, manufactured by Eastman Chemical Company) | 30 parts |
| Polyethylene wax (Mn: 2000) (T-10P-2, manufactured by Gifu Shellac Manufacturing Co., Ltd.) | 3 parts |
| Tetrafluoroethylene resin (average particle diameter: 3 μm) (Lubron L-2, manufactured by Daikin Industries) | 1 part |
| Methyl ethyl ketone/toluene (mass ratio 1:1) | 700 parts |

Example 9

The same procedure as described in Example 1 was repeated, except for replacing the coating liquid for forming protective layer 1 with a coating liquid for forming protective layer 9 having the following composition, in order to prepare a protective layer transfer sheet of Example 9.

| (Coating liquid for forming protective layer 9) | |
|---|---|
| Cellulose acetate propionate (Mn: 15000) (CAP504-0.2, manufactured by Eastman Chemical Company, Ltd.) | 70 parts |
| Cellulose acetate butyrate (Mn: 6000) (Solus 2100, manufactured by Eastman Chemical Company) | 30 parts |
| Polyethylene wax (Mn: 2000) (T-10P-2, manufactured by Gifu Shellac Manufacturing Co., Ltd.) | 15 parts |
| Methyl ethyl ketone/toluene (mass ratio 1:1) | 700 parts |

Example 10

The same procedure as described in Example 1 was repeated, except for replacing the coating liquid for forming protective layer 1 with a coating liquid for forming protective layer 10 having the following composition, in order to prepare a protective layer transfer sheet of Example 10.

| (Coating liquid for forming protective layer 10) | |
|---|---|
| Cellulose acetate propionate (Mn: 15000) (CAP504-0.2, manufactured by Eastman Chemical Company, Ltd.) | 70 parts |
| Cellulose acetate butyrate (Mn: 6000) (Solus 2100, manufactured by Eastman Chemical Company) | 30 parts |
| Polyethylene wax (Mn: 3000) (T-10P-3, manufactured by Gifu Shellac Manufacturing Co., Ltd.) | 3 parts |
| Methyl ethyl ketone/toluene (mass ratio 1:1) | 700 parts |

Example 11

The same procedure as described in Example 1 was repeated, except for replacing the coating liquid for forming protective layer 1 with a coating liquid for forming protective layer 11 having the following composition, in order to prepare a protective layer transfer sheet of Example 11.

| (Coating liquid for forming protective layer 11) | |
|---|---|
| Cellulose acetate propionate (Mn: 15000) (CAP504-0.2, manufactured by Eastman Chemical Company, Ltd.) | 70 parts |
| Cellulose acetate butyrate (Mn: 6000) (Solus 2100, manufactured by Eastman Chemical Company) | 30 parts |
| Polyethylene wax (Mn: 5000) (T-10P-5, manufactured by Gifu Shellac Manufacturing Co., Ltd.) | 15 parts |
| Methyl ethyl ketone/toluene (mass ratio 1:1) | 700 parts |

Example 12

The same procedure as described in Example 1 was repeated, except for replacing the coating liquid for forming protective layer 1 with a coating liquid for forming protective layer 12 having the following composition, in order to prepare a protective layer transfer sheet of Example 12.

| (Coating liquid for forming protective layer 12) | |
|---|---|
| Cellulose acetate propionate (Mn: 15000) (CAP504-0.2, manufactured by Eastman Chemical Company, Ltd.) | 70 parts |
| Cellulose acetate butyrate (Mn: 6000) (Solus 2100, manufactured by Eastman Chemical Company) | 30 parts |
| Silicone resin minute particles (average particle diameter: 2 μm) (Tospearl 120, manufactured by Momentive Performance Materials Inc.) | 3 parts |
| Methyl ethyl ketone/toluene (mass ratio 1:1) | 700 parts |

In the same manner as in Example 1, the protective layer of the protective layer transfer sheet of each Example was transferred onto the print in order to obtain image formed articles of Examples 7-12.

(Evaluation of Abrasion Resistance)

Onto each image formed article of Examples 7-12, which was obtained by the protective layer transfer as described above, a calico #3 (cotton fabric for test) was superposed, and then, the superposed material underwent a 50 times reciprocating abrasion test while applying a load of 10 g/cm$^2$. The abrasion resistance of the protective layer was observed by visually, and the evaluation of abrasion resistance was done under the following evaluation criteria. The evaluation results of the abrasion resistance are shown in Table 1.

<Evaluation Criteria>
◉: The image was not affected at all.
○: Although the image was beginning to be affected by wear, but it was hardly noticeable.
Δ: a certain degree of wear was observed.
x: The image was fairly worn.

TABLE 2

| | Abrasion resistance |
|---|---|
| Example 5 | ○ |
| Example 6 | ○ |
| Example 7 | ○ |
| Example 8 | ◉ |
| Example 9 | ○ |
| Example 10 | ○ |
| Example 11 | ○ |
| Example 12 | X |

As is apparent from the results shown in Table 1, according to the protective layer transfer sheets of Examples 1 to 12, which satisfy the matters specifying the invention, it was possible to obtain good results in all of the evaluations for the plasticizer resistance, the dyeability, and the releasability. In particular, with respect to the protective layer transfer sheet of Example 6 where the inorganic minute particles' layer was provided on the protective layer, it was possible to improve further the dyeability. Further, according to the protective layer transfer sheets of Examples 1 to 11, which contained a polyethylene wax of satisfying the predetermined condition, it is possible to obtain good results in the evaluation for the abrasion resistance. Furthermore, according to the protective layer transfer sheets of Example 8, which contained a fluorine resin in addition to the polyethylene wax, it was possible to improve further the abrasion resistance. On the other hand, the protective layer transfer sheets of Comparative Examples 1 to 3, which did not satisfy the matters specifying the invention, were inferior to the protective layer transfer sheets of Examples, with respect to at least one or more of their results in the evaluations for the plasticizer resistance, the dyeability, and the releasability. From these facts, the superiority of the protective layer transfer sheet according to the present invention became evident.

EXPLANATION OF THE NUMERALS 10,100 . . . protective layer transfer sheet
1 . . . substrate
2 . . . protective layer
3 . . . adhesive layer
5 . . . back face layer

The invention claimed is:

1. A protective layer transfer sheet which comprises a substrate, a protective layer peelably formed on the substrate,
   wherein the protective layer comprises (A) one or both of a cellulose ester having a number average molecular weight (Mn) of not less than 15000 and not more than 30000 and a vinyl chloride-vinyl acetate copolymer having a number average molecular weight (Mn) of not less than 15000 and not more than 30000, and (B) a cellulose ester having a number average molecular weight (Mn) of not more than 7000,
   wherein the ratio of the total content of the components (A) and (B) to the total solid content in the protective layer is not less than 70% by mass, and
   wherein the ratio of the content of the component (B) to the total mass of the components (A) and (B) is not less than 10% by mass and not more than 30% by mass.

2. The protective layer transfer sheet according to claim 1, wherein the protective layer further contains a polyethylene wax having a number average molecular weight (Mn) of not less than 2000 and not more than 3000,
   wherein the ratio of the content of the polyethylene wax to the total solid content in the protective layer is not less than 1% by mass and not more than 10% by mass.

3. The protective layer transfer sheet according to claim 2, wherein the protective layer further contains a fluorinated resin.

4. The protective layer transfer sheet according to claim 1, wherein the protective layer further contains a fluorinated resin.

* * * * *